(12) United States Patent
Woo

(10) Patent No.: US 11,184,750 B2
(45) Date of Patent: Nov. 23, 2021

(54) REMOTE CONTROL DEVICE, VEHICLE COMMUNICATING WITH THE SAME AND CONTROL METHOD OF VEHICLE

(71) Applicants: HYUNDAI MOTOR COMPANY, Seoul (KR); KIA MOTORS CORPORATION, Seoul (KR)

(72) Inventor: Ji Hyun Woo, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/936,889

(22) Filed: Jul. 23, 2020

(65) Prior Publication Data
US 2021/0185496 A1 Jun. 17, 2021

(30) Foreign Application Priority Data
Dec. 13, 2019 (KR) .................. 10-2019-0167090

(51) Int. Cl.
*H04W 4/44* (2018.01)
*B60R 16/037* (2006.01)
*B60R 25/20* (2013.01)
*G08C 17/02* (2006.01)
*B60R 16/023* (2006.01)
*B60R 25/24* (2013.01)

(52) U.S. Cl.
CPC .......... *H04W 4/44* (2018.02); *B60R 16/0231* (2013.01); *B60R 16/037* (2013.01); *B60R 25/209* (2013.01); *B60R 25/24* (2013.01); *G08C 17/02* (2013.01)

(58) Field of Classification Search
CPC .... H04W 4/44; B60R 16/0231; B60R 16/037; B60R 25/209; B60R 25/24; G08C 17/02
See application file for complete search history.

(56) References Cited

U.S. PATENT DOCUMENTS

| | | | | |
|---|---|---|---|---|
| 2010/0052931 A1* | 3/2010 | Kolpasky | ............... | B60R 25/00 340/670 |
| 2010/0075655 A1* | 3/2010 | Howarter | .......... | H04M 1/72415 455/420 |
| 2014/0156112 A1* | 6/2014 | Lee | ...................... | B60R 25/245 701/2 |
| 2014/0342668 A1* | 11/2014 | Kyomitsu | .......... | G07C 9/00944 455/41.2 |

(Continued)

*Primary Examiner* — Thomas D Alunkal
(74) *Attorney, Agent, or Firm* — McDonnell Boehnen Hulbert & Berghoff LLP

(57) ABSTRACT

In accordance with one aspect of the disclosure, a remote control device includes a transceiver configured to communicate with a user terminal or a vehicle, a sensor configured to obtain a motion information, a storage configured to store a motion table including at least one designated motion and at least one function matched thereto, and a controller configured to identify whether the designated motion corresponding to the obtained motion information exists among at least one designated motion included in the motion table, generate a control command for performing at least one function matching the designated motion corresponding to the obtained motion information based on the identification result, and control the transceiver to transmit the generated control command to the user terminal or the vehicle.

18 Claims, 6 Drawing Sheets

(56) References Cited

U.S. PATENT DOCUMENTS

2015/0116079 A1\* 4/2015 Mishra ................. H04W 12/06
340/5.52
2017/0282856 A1\* 10/2017 Riedel ..................... B60R 25/24
2020/0219338 A1\* 7/2020 Chen .................... G07C 9/0069

\* cited by examiner

FIG.3

| USER INFORMATION | FUNCTION | DESIGNATED MOTION |
|---|---|---|
| USER 1 | ACTIVATION | S |
| | LOCK | L |
| | UNLOCK | U |
| | PANIC ALARM | P |
| | BATTERY INFORMATION DISPLAY | B |
| USER 2 | ACTIVATION | 0 |
| | LOCK | 1 |
| | UNLOCK | 2 |
| | BATTERY INFORMATION DISPLAY | 8 |

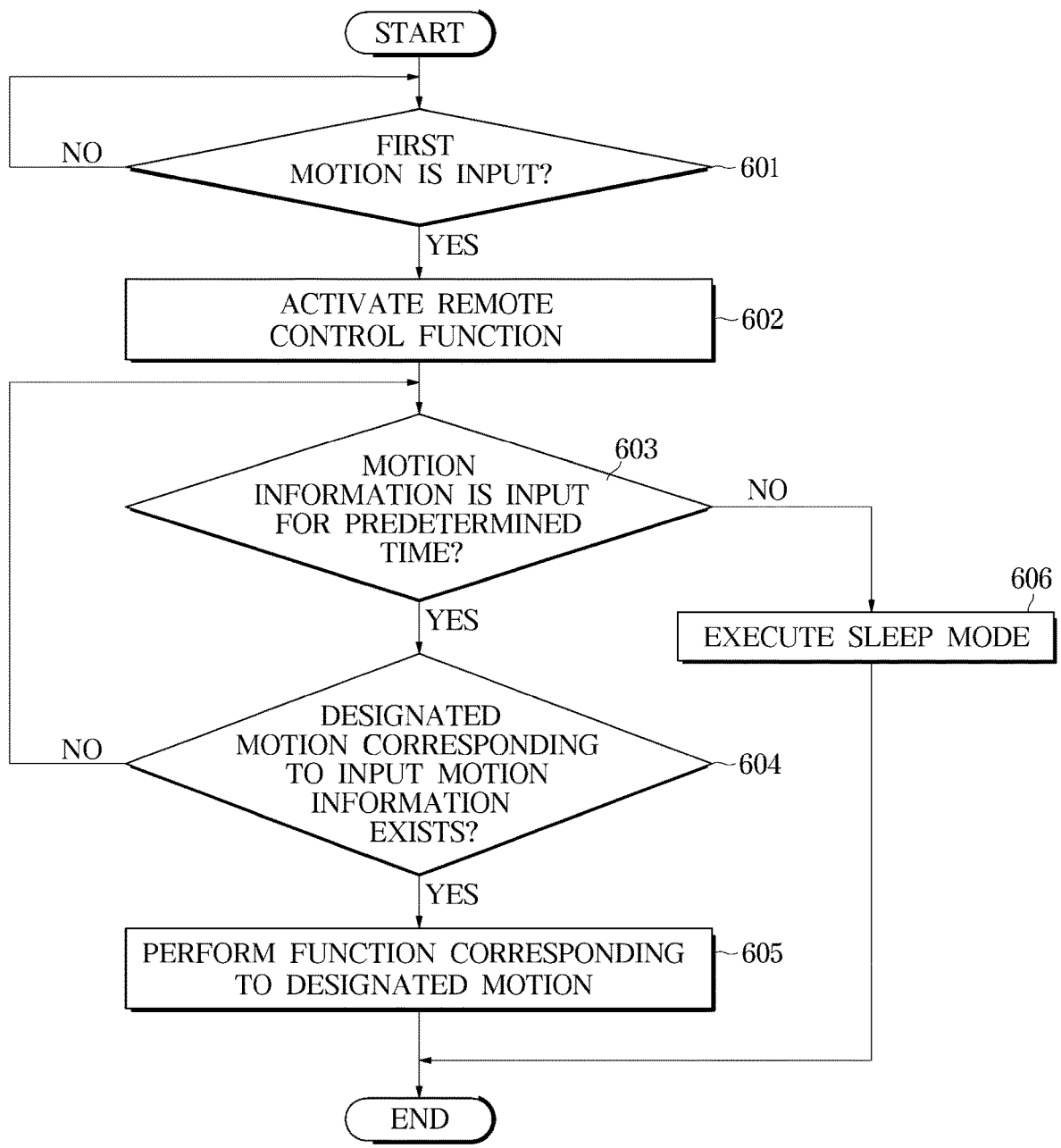

REMOTE CONTROL DEVICE, VEHICLE COMMUNICATING WITH THE SAME AND CONTROL METHOD OF VEHICLE

CROSS REFERENCE TO RELATED APPLICATIONS

This application is based on and claims priority under 35 U.S.C. § 119 to Korean Patent Application No. 10-2019-0167090, filed on Dec. 13, 2019 in the Korean Intellectual Property Office, the disclosure of which is incorporated herein by reference.

BACKGROUND

1. Technical Field

The disclosure relates to a remote control device and a control method thereof.

2. Description of the Related Art

A remote control system of the vehicle is capable of opening and closing the vehicle door and starting the vehicle from outside without requiring the driver to insert a separate key into the vehicle key box and without any special manipulation for operation. A remote control device such as a smart card that is easy to carry or a fob for wireless communication is used in the remote control system of the vehicle.

In a remote control system of a vehicle using a conventional remote control device, a user performs remote control of the vehicle by manipulating at least one button provided on the remote control device.

SUMMARY

Therefore, it is an aspect of the disclosure to provide a remote control device capable of wireless communication with the vehicle, and a control method thereof.

In accordance with one aspect of the disclosure, a remote control device includes a transceiver configured to communicate with a user terminal or a vehicle, a sensor configured to obtain a motion information, a storage configured to store a motion table including at least one designated motion and at least one function matched thereto, and a controller configured to identify whether the designated motion corresponding to the obtained motion information exists among at least one designated motion included in the motion table, generate a control command for performing at least one function matching the designated motion corresponding to the obtained motion information based on the identification result, and control the transceiver to transmit the generated control command to the user terminal or the vehicle.

The transceiver may include a wireless communication module configured to perform wireless communication with the vehicle, and the controller may be configured to activate the wireless communication module when the obtained motion information corresponds to the first motion among the stored at least one designated motion.

The vehicle may further include a battery, and the controller may be configured to generate a control command for displaying an information of the battery when the obtained motion information corresponds to a second motion among the stored at least one designated motion.

The vehicle may further include a light emitting element, and the controller may be configured to control the light emitting element to display the information of the battery when the obtained motion information corresponds to a second motion among the stored at least one designated motion.

The controller may be configured to generate a control command for unlocking the door of the vehicle when the obtained motion information corresponds to a third motion among the stored at least one designated motion and control the transceiver to transmit the control command to unlock the door of the vehicle to the vehicle.

The controller may be configured to control the transceiver to transmit a control command for changing a setting value of at least one of the seat, air conditioner or Audio/Video/Navigation (AVN) device of the vehicle to a value corresponding to user to the vehicle when the obtained motion information corresponds to the third motion.

The storage may be configured to store a user-specific motion table, the transceiver may be configured to receive a user information from the user terminal or the vehicle, and the controller may be configured to identify a user based on the received user information and generate a control command for performing a function corresponding to the obtained motion information based on the identified user's motion table.

The transceiver may be configured to perform NFC communication with the user terminal, and receive the user information from the user terminal when the user terminal is tagged.

The vehicle may further include a battery, and the controller may be configured to control the transceiver to transmit an information of the battery to the user terminal when the user terminal is tagged.

The transceiver may be configured to receive a motion table input by a user from the user terminal or the vehicle, and update a motion table stored in the storage based on the received motion table.

The controller may be configured to execute a sleep mode to minimize power consumption when the motion information is not obtained for a predetermined time.

In accordance with one aspect of the disclosure, a control method of a remote control device including a wireless communication module for performing wireless communication with the vehicle, includes: obtaining a motion information, identifying whether the designated motion corresponding to the obtained motion information exists among at least one designated motion included in the motion table, generating a control command for performing at least one function matching the designated motion corresponding to the obtained motion information based on the identification result, and transmitting the generated control command to the user terminal or the vehicle.

The control method may further include activating the wireless communication module when the obtained motion information corresponds to a first motion among the stored at least one designated motion.

The generating the control command may include generating a control command for displaying an information of the battery when the obtained motion information corresponds to a second motion among the stored at least one designated motion.

The generating the control command may include generating a control command for unlocking the door of the vehicle when the obtained motion information corresponds to a third motion among the stored at least one designated motion, and the transmitting the generated control command may include: transmitting the control command to unlock the door of the vehicle to the vehicle.

The transmitting the generated control command may include transmitting a control command for changing a setting value of at least one of the seat, air conditioner or Audio/Video/Navigation (AVN) device of the vehicle to a value corresponding to user to the vehicle when the obtained motion information corresponds to the third motion.

The control method may further include receiving a user information from the user terminal or the vehicle, and identifying a user based on the received user information, and the generating the control command may include: generating a control command for performing a function corresponding to the obtained motion information based on the identified user's motion table.

The receiving the user information may include receiving the user information from the user terminal when the user terminal is tagged.

The control method may further include receiving a motion table input by a user from the user terminal or the vehicle, and updating a pre-stored motion table based on the received motion table.

The control method may further include executing a sleep mode to minimize power consumption when the motion information is not obtained for a predetermined time.

BRIEF DESCRIPTION OF THE FIGURES

These and/or other aspects of the disclosure will become apparent and more readily appreciated from the following description of the embodiments, taken in conjunction with the accompanying drawings of which:

FIG. 3 is an example of a motion table according to an embodiment of the disclosure.

FIG. 6 is a flowchart of a control method of a remote control device according to an embodiment of the disclosure.

DETAILED DESCRIPTION

Figure 1:
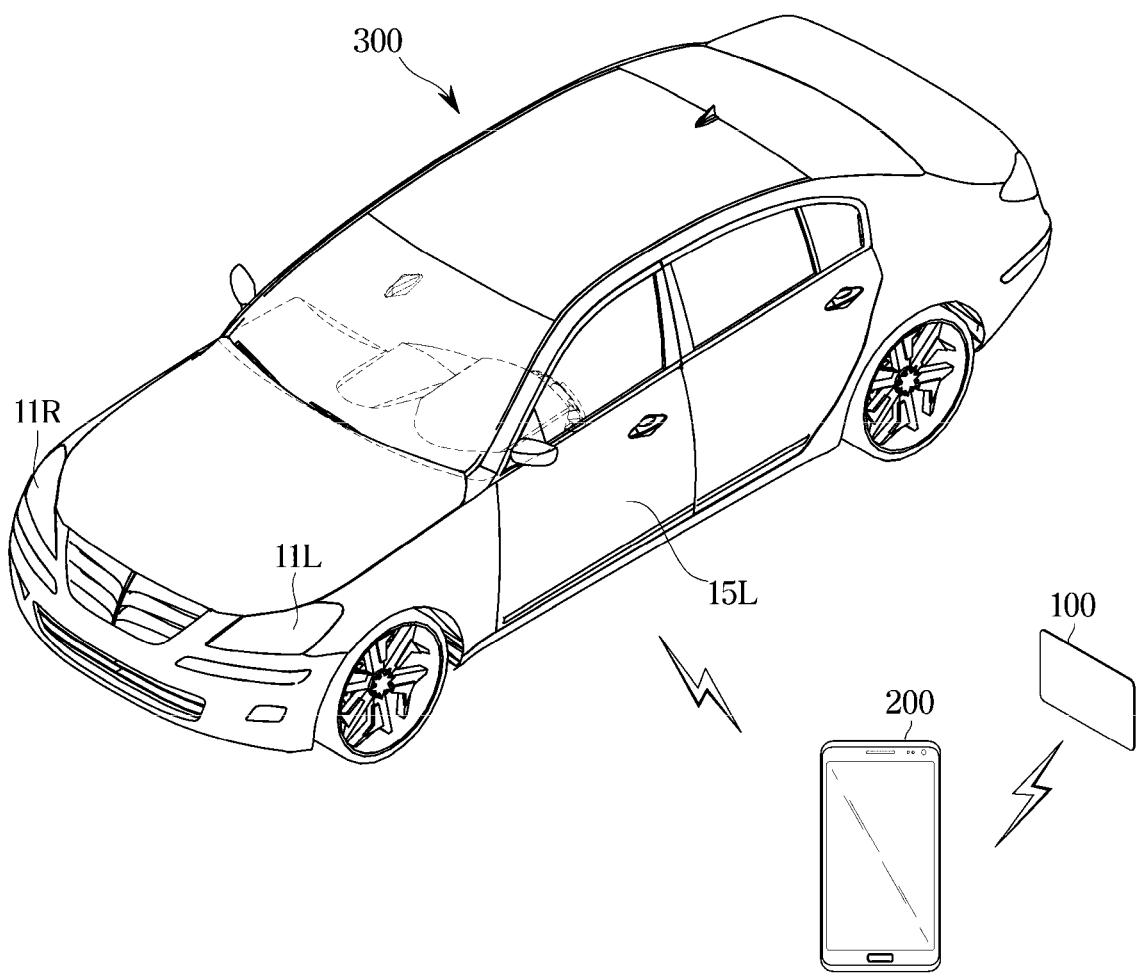
FIG. 1 is a view illustrating a remote system according to an embodiment of the disclosure.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 is a view illustrating a remote system according to an embodiment of the disclosure.

Referring to FIG. 1, the remote system 1 according to an embodiment includes a remote control device 100, a user terminal 200, and a vehicle 300.

The remote control device 100 may perform wireless communication with the user terminal 200 or vehicle 300.

The user may transmit a control command to the vehicle 300 through the remote control device 100, and the vehicle 300 may provide various user convenience functions based on the received control command.

Here, the user includes not only the driver but also a passenger in the vehicle 300, and includes a person who has the remote control device 100.

For example, the vehicle 300 may lock or unlock the door 15L based on a user's command received through the remote control device 100.

In addition, when there is a risk of theft, the user may control the vehicle 300 so that the vehicle 300 provides a panic function through the remote control device 100. When receiving a control command for the execution of the panic function from the remote control device 100, the vehicle 300 may output a warning sound to the surroundings or turn on the headlights 11L and 11R.

The user terminal 200 may transmit and receive various information with the remote control device 100 or the vehicle 300. To this end, the user terminal 200 may be connected to the remote control device 100 or vehicle 300 through a local area network.

Here, the local area network means a communication network using a wireless LAN, a Wi-Fi, a Bluetooth, a zigbee, a Wi-Fi Direct (WFD), an ultra wideband (UWB), an infrared data association (IrDA), a Bluetooth Low Energy (BLE), a Near Field Communication (NFC), and a radio frequency identification (RFID), but is not limited thereto.

Meanwhile, the user terminal 200 may be implemented as a computer or a portable terminal that may access the vehicle 100 through a network. Here, the computer includes, for example, a laptop equipped with a WEB Browser, a desktop, a laptop, a tablet PC, a slate PC, and the like. The portable terminal is, for example, a wireless communication device that is guaranteed for portability and mobility, and may include all kinds of handheld-based wireless communication devices such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (WiBro) terminal, Smart Phone, and may include a wearable devices such as watch, ring, bracelet, anklet, necklace, glasses, contact lenses, or a head-mounted-devices (HMDs).

Figure 2:
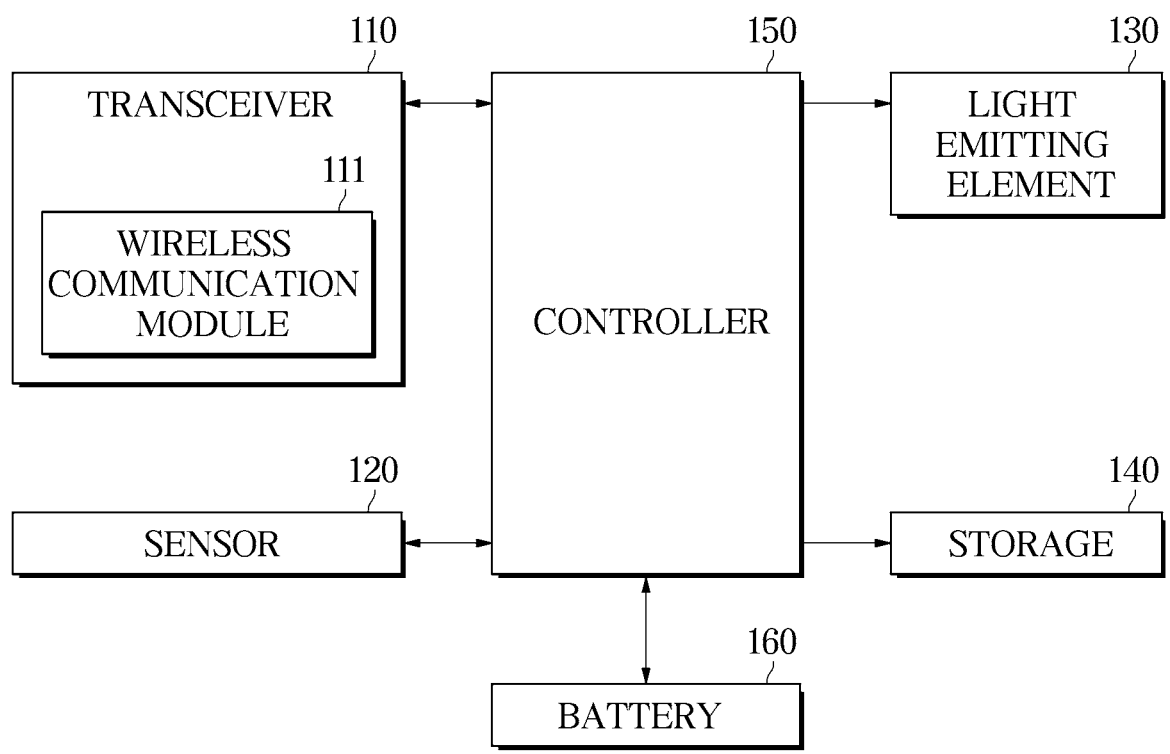
FIG. 2 is a control block diagram of a remote control device according to an embodiment of the disclosure.

FIG. 2 is a control block diagram of a remote control device according to an embodiment of the disclosure.

Referring to FIG. 2, the remote control device 100 according to an embodiment may include a transceiver 110, sensor 120, display 130, storage 140, controller 150 and battery 160.

First, the transceiver 110 may communicate with the vehicle 300 or the user terminal 200, and may transmit and receive various information.

The transceiver 110 may transmit a control command for performing at least one function to the vehicle 300 or the user terminal 200.

Alternatively, the transceiver 110 may receive various information from the vehicle 300 or the user terminal 200.

Specifically, the transceiver 110 may receive a motion table input by the user from the vehicle 300 or the user terminal 200. At this time, the motion table refers to information including at least one designated motion and at least one function matching it, and a detailed description related thereto will be described later.

Also, the transceiver 110 may receive user information from the vehicle 300 or the user terminal 200. The user information means information for identifying a user, and may include, for example, a unique identification number preset by the user or an identification number of the user terminal 200.

To this end, the transceiver 110 may include a wireless communication module 111.

In addition to the Wifi module and the Wireless broadband module, the wireless communication module supporting a wireless communication scheme include such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE).

The wireless communication module may include a wireless communication interface including an antenna for transmitting a control command signal and a transmitter. The wireless communication module may further include a signal conversion module configured to modulate the digital control signal output from the controller 150 into an analog type wireless signal through the wireless communication interface under the control of the controller.

The wireless communication module may include a wireless communication interface including an antenna for receiving a signal and a receiver. The wireless communication module may further include a signal conversion module for demodulating the analog signal received through the wireless communication interface into a digital control signal. Also, the wireless communication module may further include a signal conversion module for demodulating the analog signal received through the wireless communication interface into a digital control signal.

In this case, the antenna may be implemented as an LF antenna that transmits and receives a low frequency (LF) signal or an RF antenna that transmits a radio frequency (RF) signal.

In addition, the transceiver 110 may include one or more components that enable communication with an external device of the vehicle 300 or the user terminal 200, and, for example, may include at least one of a short range communication module, a wired communication module, and a wireless communication module.

The short range communication module may include various local area communication modules for transmitting and receiving signals using a wireless communication network such as a Bluetooth module, an infrared communication module, a radio frequency identification (RFID) communication module, a wireless local access network (WLAN) communication module, an NFC communication module, a zigbee communication module, or the like.

The wired communication module can be a variety of wired devices such as a controller area network (CAN) module, a local area network (LAN) module, a wide area network (WAN) module, or a value added network (VAN) module, and also include various cable communication modules such as Universal Serial Bus (USB), High Definition Multimedia Interface (HDMI), Digital Visual Interface (DVI), returned standard232 (RS-232), power line communication, or plain old telephone service (POTS).

The sensor 120 may obtain a motion information related to motion of the remote control device 100. The motion information refers to information indicating the movement of the remote control device 100.

When the user moves the remote control device 100, the sensor 120 may obtain a motion information corresponding to the movement of the remote control device 100. The motion information may be transmitted to the controller 150 and used as a control basis.

To this end, the sensor 120 may include various sensors for obtaining data corresponding to the movement of the remote control device 100. The sensor 120 may include at least one of an acceleration sensor, a gyroscope sensor, or a magnetic sensor.

The battery 160 supplies power to at least one component included in the remote control device 100. To this end, the battery 160 may include a rechargeable secondary battery. For example, the battery 160 may be formed of a lithium ion polymer type battery. However, the disclosure is not limited to this, and may be composed of various types of batteries.

The light emitting element 130 means an element that emits light. For example, the light emitting element 130 may be implemented with at least one light emitting diode (LED) or at least one organic light emitting diode (OLED).

The light emitting element 130 may display various information about the battery 160, including the remaining charge of the battery 160 or the state of the battery 160 by outputting light in various ways.

For example, the light emitting element 130 may notify the user of various states such as a charging state, a failure state, or a discharging state of the battery 160 by varying the color, brightness, and lighting cycle of light. Through this, the user may prevent the discharge of the battery 160 in advance, thereby increasing convenience.

The storage 140 may store a motion table including at least one designated motion and at least one function matching the at least one designated motion.

The designated motion constituting the motion table and at least one function matching the at least one designated motion may be registered by the user. Information about the designated motion registered by the user through the vehicle 300 or the user terminal 200 and at least one function matching the same may be received by the transceiver 110.

Further, the storage 140 may store a motion table including at least one function matching a designated motion for each user. A detailed description thereof will be described later.

The storage 140 may be implemented as at least one of a non-volatile memory device such as a cache, read only memory (ROM), programmable ROM (PROM), erasable programmable ROM (EPROM), electrically erasable programmable ROM (EPMROM) and flash memory, and a volatile memory device such as a random access memory (RAM) or a storage medium such as a hard disk drive (HDD) or CD-ROM, but is not limited thereto. The storage 140 may be a memory implemented in a separate chip from the processor described below with respect to the controller 150, or may be implemented in a single chip with the processor.

The controller 150 may perform overall control of the internal configuration of the remote control device 100.

The controller 150 may generate a control command for performing at least one function corresponding to motion information obtained based on a motion table. The controller 150 may allow the user terminal 200 or the vehicle 300 to provide a function corresponding to motion information input by the user by controlling the transceiver 110 to transmit the generated control command to the user terminal 200 or vehicle 300.

Specifically, the controller 150 may identify whether there is a designated motion corresponding to motion information obtained by the sensor 120 among at least one designated motion included in the motion table. When a designated motion corresponding to the obtained motion information is identified, the controller 150 may generate a control command for performing at least one function matching the designated motion corresponding to the obtained motion information.

When the obtained motion information corresponds to the first motion of the at least one designated motion, the controller 150 may activate at least one internal configuration of the remote control device 100.

Specifically, when the obtained motion information corresponds to the first motion of the at least one designated motion, the controller 150 may activate the transceiver 110. More specifically, the controller 150 may activate the wireless communication module 111 so that the remote control device 100 is in a communication-enabled state capable of transmitting control commands to the vehicle 300.

Through this, the controller 150 may prevent unnecessary power consumption by activating the transceiver 110 only when the first motion is detected. In addition, the controller 150 may improve the accuracy of the remote control by preventing the control command generated due to the recognition of incorrect motion information from being transmitted to the vehicle 300.

Alternatively, when the obtained motion information corresponds to the first motion of the at least one designated motion, the controller 150 may activate the sensor 120 so that the sensor 120 obtains accurate motion information. Specifically, the controller 150 may transmit an activation signal to the sensor 120, and the sensor 120 may detect motion information in real time according to the activation signal from the controller 150.

The sensor 120 may consume the minimum first power capable of detecting the first motion before the activation signal from the controller 150 is transmitted, and may consume a second power greater than the first power to more accurately detect motion information after the activation signal from the controller 150 is transmitted.

Through this, the controller 150 may prevent unnecessary power consumption by activating the sensor 120 only when the first motion is detected. In addition, when the first motion is detected, the controller 150 may identify that the user intends to use the remote control function, and then activate the sensor 120 to obtain more accurate motion information. Therefore, it is possible to prevent the control command generated due to inaccurate motion recognition from being transmitted to the vehicle 300. Therefore, the accuracy of remote control and user convenience may be increased.

When the obtained motion information corresponds to the second motion among the at least one designated motion, the controller 150 may generate a control command for displaying information of the battery 160, and may control the transceiver 110 to transmit the generated control command to the vehicle 300 or the user terminal 200.

At this time, the information of the battery 160 refers to information related to the battery 160, and may include information related to charging of the battery 160, such as a charging capacity of the battery 160. In addition to this, the information of the battery 160 may further include information regarding a failure state or a discharge state of the battery 160.

Alternatively, when the obtained motion information corresponds to the second motion of the at least one designated motion, the controller 150 may control the light emitting element 130 to display information of the battery 160.

Specifically, the controller 150 may control the color, brightness, and lighting cycle of light emitted by the light emitting element 130 to be changed according to various states of the battery. Alternatively, in an embodiment in which a plurality of light emitting elements 130 are configured, the controller 150 may intuitively provide a charging state of the battery 160 to the user by varying the number of light emitting elements 130 that are turned on according to the state of charge of the battery 160.

Through this, the user may obtain information regarding various states of the battery 160 such as a charging state, a failure state, or a discharge state. Therefore, since the battery 160 may be prevented from being discharged in advance, the user's convenience may be increased.

When the obtained motion information corresponds to a third motion among at least one designated motion, the controller 150 may generate a control command for locking or unlocking the door of the vehicle 300, and may control the transceiver 110 to transmit the generated control command to the vehicle 300.

The controller 150 may transmit a setting command for changing a setting value for at least one of a seat, air conditioner, or AVN (Audio/Video/Navigation) device of the vehicle 300 to a value corresponding to user information with control command to lock or unlock the door 15L of vehicle 300 to the vehicle 300.

To this end, setting values for at least one of a seat, air conditioner or AVN (Audio/Video/Navigation) device of the vehicle 300 may be stored in the storage 140 for each user information.

The controller 150 may identify a user based on user information received from the user terminal 200. At this time, user information may be transmitted to the controller 150 through the transceiver 110 when the user terminal 200 is tagged.

In other words, when the user tags the user terminal 200 to the transceiver 110, user information from the user terminal 200 may be transmitted to the transceiver 110. At this time, the transceiver 110 may perform short-range communication with the user terminal 200, for example, NFC communication.

Through this, the vehicle 300 may control at least one of a seat, air conditioner, or AVN device based on a setting value suitable for a user individual of the remote control device 100. Therefore, user convenience may be increased.

In addition, when motion information is not obtained for a predetermined time, the controller 150 may execute a sleep mode to minimize power consumption.

Specifically, the controller 150 may execute a sleep mode by deactivating at least one internal configuration of the remote control device 100. For example, the controller 150 may minimize power consumption by converting the transceiver 110 or the sensor 120 into a state before the activation signal is transmitted. Therefore, unnecessary power consumption may be prevented.

On the other hand, the controller 150 may be implemented by a memory (not shown) for storing algorithm for controlling the operation of the components in the remote control device 100 or data for the program that reproduces the algorithm, and a processor (not shown) for performing the above-described operation using the data stored in the memory. In this case, the memory and the processor may be implemented as separate chips. Alternatively, the memory and the processor may be implemented in a single chip.

At least one component may be added or deleted in response to the performance of the components of the remote control device 100 shown in FIG. 2. In addition, it will be readily understood by those skilled in the art that the mutual location of components may be changed in response to the performance or structure of the system.

Meanwhile, each component illustrated in FIG. 2 refers to software and/or hardware components such as a Field Programmable Gate Array (FPGA) and an Application Specific Integrated Circuit (ASIC).

FIG. 3 is an example of a motion table according to an embodiment of the disclosure.

Referring to FIG. 3, a user of the remote control device 100 according to an embodiment may register a motion table including at least one designated motion and at least one function corresponding thereto through the vehicle 300 or the user terminal 200.

Specifically, a user may register a motion table by inputting at least one designated motion and at least one function matched to each of the designated motion through various input devices such as an AVN device of the vehicle 300.

The motion table registered by the user through the input device of the vehicle 300 may be transmitted to the remote control device 100 or the user terminal 200. To this end, the vehicle 300 may include a communication module capable of communicating with the remote control device 100 or the user terminal 200.

For example, vehicle 300 may include an NFC communication module, when the remote control device 100 is tagged in the NFC communication module of the vehicle 300, the transceiver 110 may receive a motion table. The controller 150 may update the motion table stored in the storage 140 based on the received motion table.

Alternatively, the user may register a motion table by inputting at least one designated motion and at least one function respectively matched to the designated motion through the user terminal 200. To this end, the user terminal 200 may include a communication module capable of communicating with the remote control device 100 or vehicle 300.

For example, user terminal 200 may include an NFC communication module, when the remote control device 100 is tagged in the NFC communication module of the vehicle 300, the transceiver 110 may receive a motion table. The controller 150 may update the motion table stored in the storage 140 based on the received motion table.

Meanwhile, the motion table registered by the user may be stored for each user. The controller 150 may store the motion table for each user information in the storage 140 by matching the user information to the motion table.

At this time, the user information means information for identifying a user, and may be received from the user terminal 200. Specifically, when the remote control device 100 is tagged in the user terminal 200, user information of the user terminal 200 may be transmitted to the remote control device 100. The controller 150 may store the motion table for each user by matching the received user information with the motion table registered by the user of the user terminal 200.

For example, as shown in FIG. 3, a first user may register a designated motion corresponding to the activation function of the remote control device 100 as 'S'. In addition, the first user may register a designated motion corresponding to the lock function for the door 15L of the vehicle 300 as 'L', and may register a designated motion corresponding to the unlock function for the door 15L of the vehicle 300 as 'U'. In addition, the first user may register a designated motion corresponding to the panic alarm function as 'P', and may register a designated motion corresponding to the battery information display function as 'B'.

The controller 150 may match user information for identifying the first user to designated motion registered by the first user, and may store a motion table for each user in the storage 140. At this time, user information for identifying the first user may be received from the user terminal of the first user. For example, the first user may tag the user terminal 200 to the remote control device 100 after registering the designated motion, the controller 150 may generate the motion table of the first user by matching the user information of the first user to the designated motion registered by the first user.

Similarly, the second user may also register designated motion corresponding to at least one function. The controller 150 may generate a motion table of the second user by matching user information received from the user terminal of the second user to a designated motion registered by the second user.

Through this, even when the user of the remote control device 100 is changed, the controller 150 identifies motion information input by the changed user based on the motion table for each user, and controls the vehicle 300 according to the identification result. Therefore, user convenience may be increased.

Figure 4:
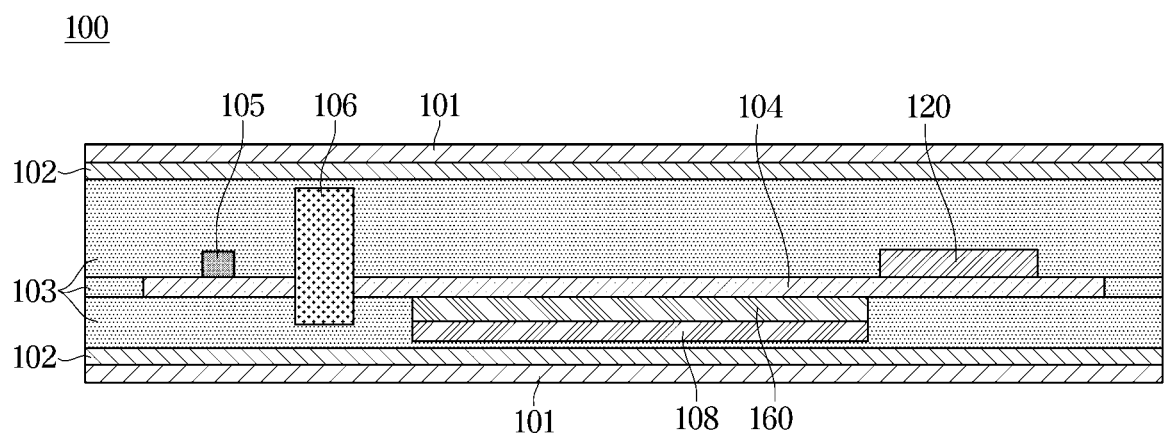
FIG. 4 is an example of a cross-sectional view schematically illustrating a remote control device according to an embodiment of the disclosure.

FIG. 4 is an example of a cross-sectional view schematically illustrating a remote control device according to an embodiment of the disclosure.

Referring to FIG. 4, the remote control device 100 according to an embodiment may be implemented in a card shape that is easy to carry.

Specifically, the remote control device 100 according to an embodiment may include a coating film 101 covering the surface of the remote control device 100, a first seat 102, a second seat 103, a Printed Circuit Board (PCB) 104, a light emitting diode 105, a first communication module 106, a sensor 120, a battery 160, and a second communication module 108.

The coating film 101 may be made of various materials for preventing contamination or damage of the surface of the remote control device 100.

The first seat 102 and the second seat 103 may provide a space for mounting various components of the remote control device 100.

The PCB 104 may be provided with the above-described processor or memory in relation to the controller 150 or storage 140. That is, the PCB 104 may be included in the controller 150 or storage 140.

The PCB 104 may be implemented as a flexible printed circuit board (FPCB), or may be implemented as a rigid printed circuit board (RPCB).

The light emitting diode 105 may be included in the light emitting element 130 and may display various information about the battery 160.

The first communication module 106 and the second communication module 108 may include a communication interface including at least one antenna or receiver of the transceiver 110. In particular, the second communication module 108 may be disposed adjacent to the battery 160, and may further include various circuit configurations for wireless charging of the battery 160. For example, the second communication module 108 may include an NFC communication module.

Since the card-shaped remote control device 100 has a thinner thickness than the existing remote control device, portability may be increased. Accordingly, the remote control device 100 may be stored in various locations such as a wallet. Therefore, user convenience may be increased.

In addition, in order to remotely control the vehicle 300, the user may move the remote control device 100 to have a displacement corresponding to a designated motion corresponding to an intended function, without pressing a separate physical input configuration such as a button. Therefore, even when the remote control device 100 is stored in a wallet or the like, remote control of the vehicle 300 may be performed without additional manipulation, so user convenience may be increased.

On the other hand, the above-described card-shaped remote control device 100 is only an embodiment, and is not limited to that illustrated in FIG. 4, electronic devices that implement various functions may be further included, and arrangements of the above-described configurations may also be freely changed.

Figure 5:
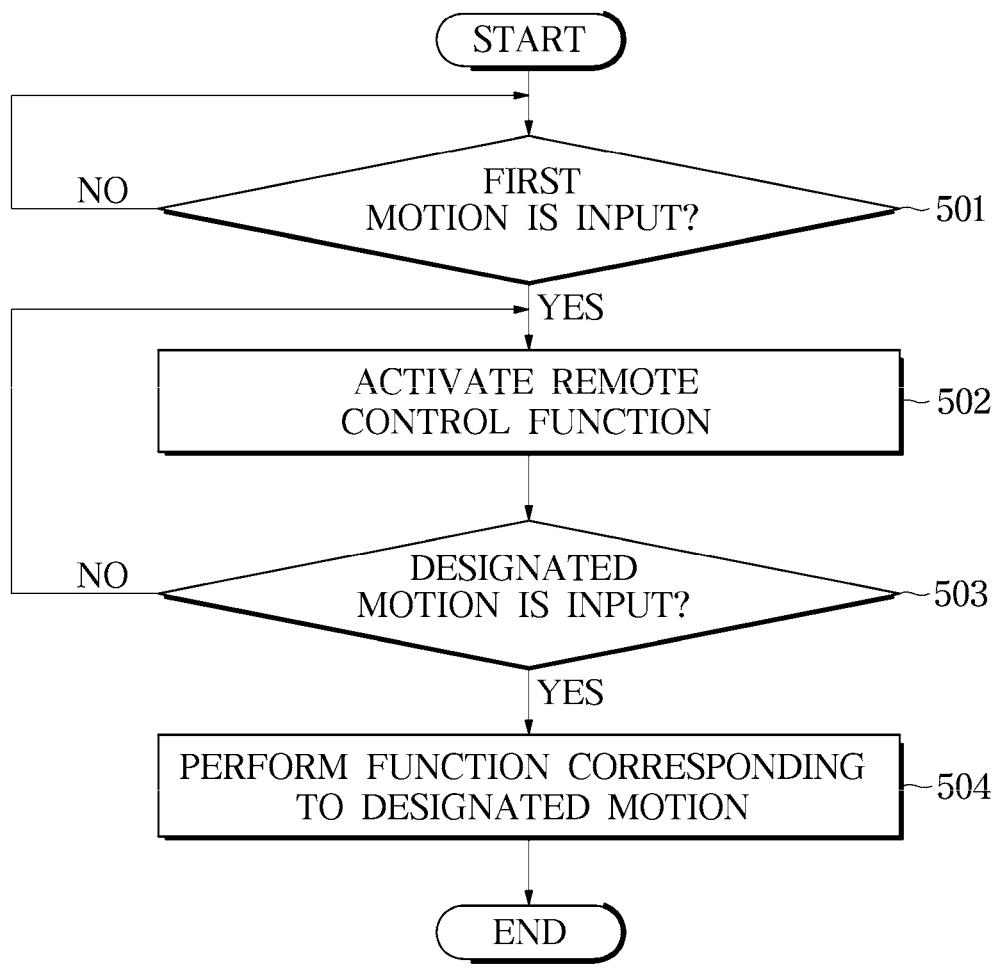
FIG. 5 is a flowchart of a control method of a remote control device according to an embodiment of the disclosure.

FIG. 5 is a flowchart of a control method of a remote control device according to an embodiment of the disclosure.

Referring to FIG. 5, the remote control device 100 according to an embodiment may confirm whether a first motion is input at step 501.

Specifically, the remote control device 100 may compare the obtained motion information with a predetermined first motion, and determine whether the obtained motion information corresponds to the first motion according to the comparison result. When the similarity between the obtained motion information and the first motion is greater than or equal to a predetermined value, the remote control device 100 may confirm that the obtained motion information corresponds to the first motion, and may confirm that the first motion is input.

At this time, the first motion may be stored in the storage 140 as a pre-specified designated motion to activate the remote control function.

When the first motion is input (YES in 501), the remote control device 100 may activate the remote control function at step 502. Specifically, the remote control device 100 may activate at least one internal configuration of the remote control device 100.

More specifically, the wireless communication module 111 of the remote control device 100 may be changed from a deactivation state to an activation state, and the remote control device 100 may be in a communication enable state to transmit control commands to the vehicle 300. Through this, since the transceiver 110 is activated only when the first motion is detected, unnecessary power consumption may be prevented. In addition, the remote control device 100 may improve the accuracy of the remote control by preventing control commands generated due to recognition of inaccurate motion information from being transmitted to the vehicle 300.

Alternatively, when the obtained motion information corresponds to the first motion of at least one designated motion, the sensor 120 may be changed from a deactivation state to an activation state, and may obtain accurate motion information.

Specifically, the sensor 120 may consume a minimum first power capable of detecting the first motion before becoming the activation state, and may consume a second power greater than the first power to more accurately detect motion information after becoming the activation state. For example, motion information may be detected in real time when the activation state is reached. Through this, the remote control device 100 may prevent unnecessary power consumption by activating the sensor 120 only when the first motion is detected.

Thereafter, the remote control device 100 may confirm whether a designated motion is input at step 503. Specifically, the remote control device 100 may obtain motion information in real time or according to a predetermined period, and may identify whether a designated motion corresponding to the obtained motion information exists among at least one designated motion included in the motion table. When it is identified that the designated motion corresponding to the obtained motion information exists, the remote control device 100 may confirm that the corresponding designated motion is input.

When it is confirmed that designated motion is input (YES in 503), the remote control device 100 may perform a function corresponding to the input designated motion at step 504. Specifically, the remote control device 100 may generate a control command for performing at least one function corresponding to the designated motion input based on the motion table, and transmit the generated control command to the vehicle 300. According to a control command from the remote control device 100, the vehicle 300 may provide a function intended by the user.

Through this, in order to remotely control the vehicle 300, the user may control the vehicle 300 by moving the remote control device 100 to have a displacement corresponding to the designated motion corresponding to the intended function, without pressing a separate physical input configuration such as a button. Therefore, user convenience may be increased.

FIG. 6 is a flowchart of a control method of a remote control device according to an embodiment of the disclosure.

Referring to FIG. 6, the remote control device 100 according to an embodiment may confirm whether first motion is input at step 601. When it is confirmed that the first motion is input, the remote control device 100 may activate the remote control function at step 602.

After the remote control function is activated, the remote control device 100 may confirm whether motion information is input for a predetermined time at step 603.

When motion information is input for a predetermined time (YES in 603), the remote control device 100 may confirm whether a designated motion corresponding to the input motion information exists at step 604. Specifically, the remote control device 100 may compare the input motion information and the designated motion stored in the motion table and may determine a designated motion having a similarity equal to or greater than a predetermined reference value with the input motion information as a designated motion corresponding to the motion information.

When the designated motion corresponding to the input motion information exists (YES in 604), the remote control device 100 may perform a function corresponding to the designated motion based on the motion table at step 605. Specifically, the remote control device 100 may generate a control command for performing at least one function corresponding to the designated motion input based on the motion table, and transmit the generated control command to the vehicle 300. According to a control command from the remote control device 100, the vehicle 300 may provide a function intended by the user.

On the other hand, when the motion information is not input for a predetermined time (No in 603), the remote control device 100 may execute a sleep mode at step 606. Specifically, the remote control device 100 may execute a sleep mode by deactivating at least one internal configuration of the remote control device 100. For example, the remote control device 100 may switch the state of at least one of the transceiver 110 or the sensor 120 to a state before the remote control function is activated by the first motion.

Through this, when motion information is not input from the user, the remote control device 100 may minimize power consumption. Therefore, unnecessary power consumption may be prevented.

Through this, the remote control device 100 may prevent unnecessary power consumption by activating the remote control function only when the first motion is detected. In addition, the remote control device 100 may improve the accuracy of the remote control by preventing control commands generated due to recognition of inaccurate motion information from being transmitted to the vehicle 300.

According to a remote control device and a control method thereof according to one aspect, the user can control the vehicle by moving the remote control device to have a displacement corresponding to the designated motion corresponding to the intended function, without pressing a separate physical input configuration such as a button. Therefore, user convenience can be increased.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

The invention claimed is:

1. A remote control device comprising:
a transceiver configured to communicate with a user terminal or a vehicle;
a sensor configured to obtain a motion information;
a storage configured to store a motion table including at least one designated motion and at least one function matched thereto; and
a controller configured to identify whether a designated motion corresponding to the obtained motion information exists among the at least one designated motion included in the motion table, generate a control command for performing at least one function matching the designated motion corresponding to the obtained motion information, and control the transceiver to transmit the generated control command to the user terminal or the vehicle;
wherein the transceiver comprises a wireless communication module configured to perform wireless communication with the vehicle;
wherein the controller is configured to activate the wireless communication module by transmitting an activation signal to the wireless communication module when the obtained motion information corresponds to the first motion among the stored at least one designated motion; and
wherein the sensor is configured to consume a first power capable of detecting the first motion before the activation signal is transmitted, and consume a second power greater than the first power after the activation signal is transmitted.

2. The remote control device according to claim 1, further comprising:
a battery, and
wherein the controller is configured to generate a control command for displaying an information of the battery when the obtained motion information corresponds to a second motion among the stored at least one designated motion.

3. The remote control device according to claim 2, further comprising:
a light emitting element, and
wherein the controller is configured to control the light emitting element to display the information of the battery when the obtained motion information corresponds to a second motion among the stored at least one designated motion.

4. The remote control device according to claim 1, wherein the controller is configured to generate a control command for unlocking a door of the vehicle when the obtained motion information corresponds to a third motion among the stored at least one designated motion, and to control the transceiver to transmit the control command to unlock the door of the vehicle to the vehicle.

5. The remote control device according to claim 4, wherein the controller is configured to control the transceiver to transmit a control command for changing a setting value of at least one of the seat, air conditioner or Audio/Video/Navigation (AVN) device of the vehicle to a value corresponding to user to the vehicle when the obtained motion information corresponds to the third motion.

6. The remote control device according to claim 1, wherein the storage is configured to store a user-specific motion table,
the transceiver is configured to receive a user information from the user terminal or the vehicle, and the controller is configured to identify a user based on the received user information and generate a control command for performing a function corresponding to the obtained motion information based on the identified user's motion table.

7. The remote control device according to claim 6, wherein the transceiver is configured to perform NFC communication with the user terminal, and receive the user information from the user terminal when the user terminal is tagged.

8. The remote control device according to claim 7, further comprising:
   a battery, and
   wherein the controller is configured to control the transceiver to transmit an information of the battery to the user terminal when the user terminal is tagged.

9. The remote control device according to claim 1, wherein the transceiver is configured to receive a motion table input by a user from the user terminal or the vehicle, and to update the motion table stored in the storage based on the received motion table input.

10. The remote control device according to claim 1, wherein the controller is configured to execute a sleep mode to minimize power consumption when the motion information is not obtained for a predetermined time.

11. A control method of a remote control device comprising a wireless communication module for performing wireless communication with the vehicle, comprising:
   obtaining a motion information at a controller;
   identifying whether the designated motion corresponding to the obtained motion information exists among at least one designated motion included in a motion table;
   generating a control command for performing at least one function matching the designated motion corresponding to the obtained motion information based on the identification result;
   activating the wireless communication module by transmitting an activation signal to the wireless communication module when the obtained information corresponds to a first motion among the stored at least one designated motion; and
   transmitting the generated control command to the user terminal or the vehicle;
   wherein the motion information is obtained from a sensor, and the sensor is configured to consume a first power capable of detecting the first motion before the activation signal is transmitted, and to consume a second power greater than the first power after the activation signal is transmitted.

12. The control method according to claim 11, wherein generating the control command comprises:
   generating a control command for displaying an information of the battery when the obtained motion information corresponds to a second motion among the stored at least one designated motion.

13. The control method according to claim 11, wherein generating the control command comprises:
   generating a control command for unlocking the door of the vehicle when the obtained motion information corresponds to a third motion among the stored at least one designated motion, and
   transmitting the control command to unlock the door of the vehicle to the vehicle.

14. The control method according to claim 13, wherein transmitting the generated control command comprises:
   transmitting a control command for changing a setting value of at least one of the seat, air conditioner or Audio/Video/Navigation (AVN) device of the vehicle to a value corresponding to user to the vehicle when the obtained motion information corresponds to the third motion.

15. The control method according to claim 11, further comprising:
   receiving user information from the user terminal or the vehicle, and
   identifying a user based on the received user information, and
   wherein the generating the control command comprises:
   generating a control command for performing a function corresponding to the obtained motion information based on the identified user's motion table.

16. The control method according to claim 15, wherein the receiving the user information comprises:
   receiving the user information from the user terminal when the user terminal is tagged.

17. The control method according to claim 11, further comprising:
   receiving a motion table input by a user from the user terminal or the vehicle; and
   updating the motion table based on the received motion table input.

18. The control method according to claim 11, further comprising:
   executing a sleep mode to minimize power consumption when the motion information is not obtained for a predetermined time.

* * * * *